Figure 1C:
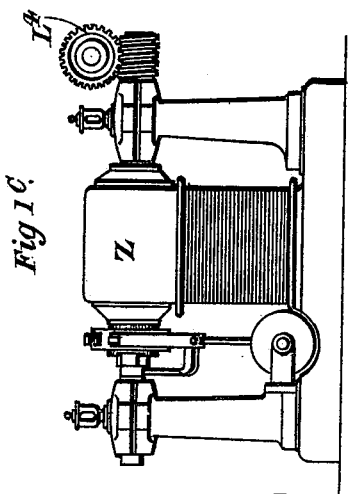

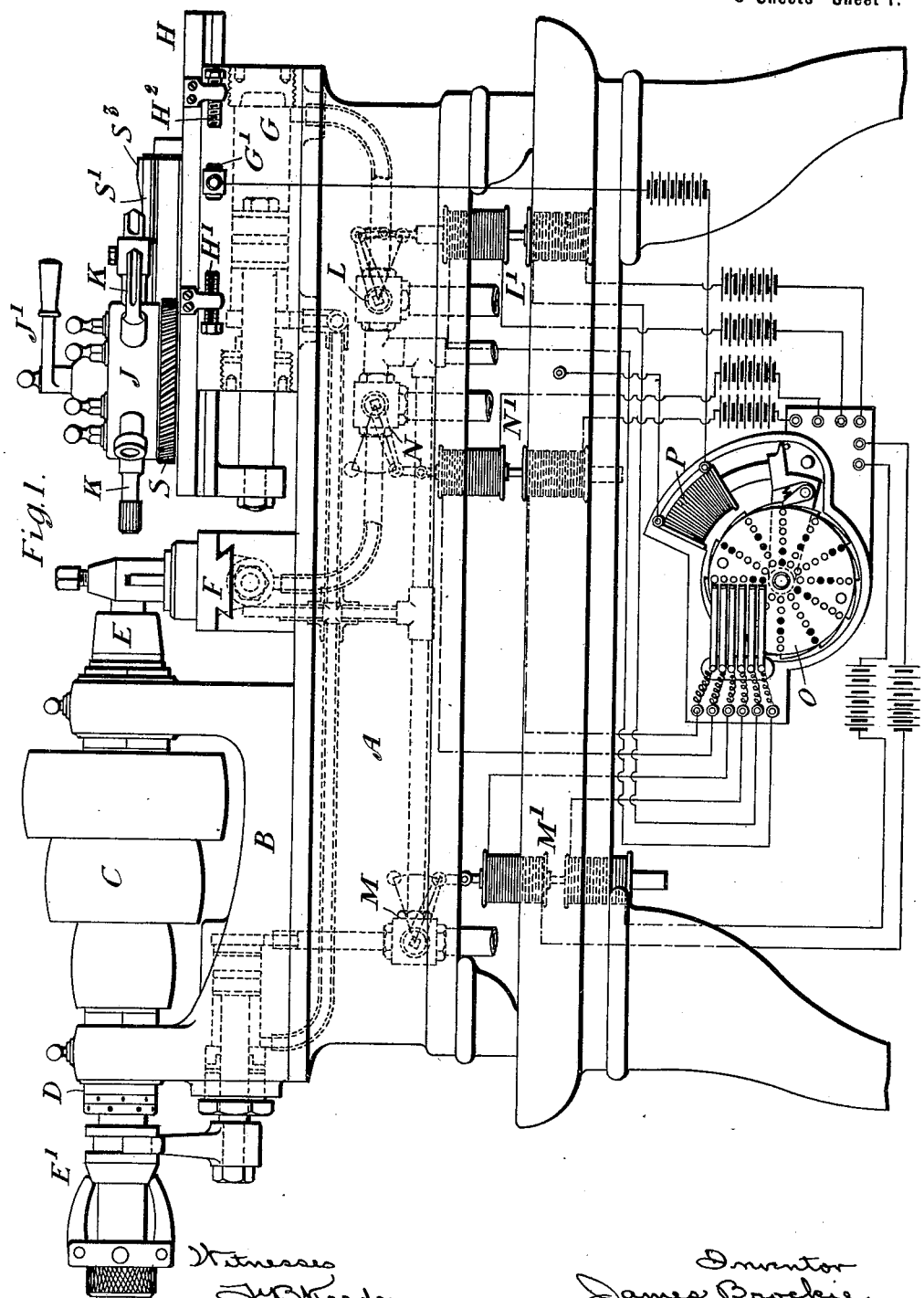

No. 627,385. Patented June 20, 1899.
J. BROCKIE.
AUTOMATIC LATHE.
(Application filed Dec. 28, 1897.)
(No Model.) 8 Sheets—Sheet 2.
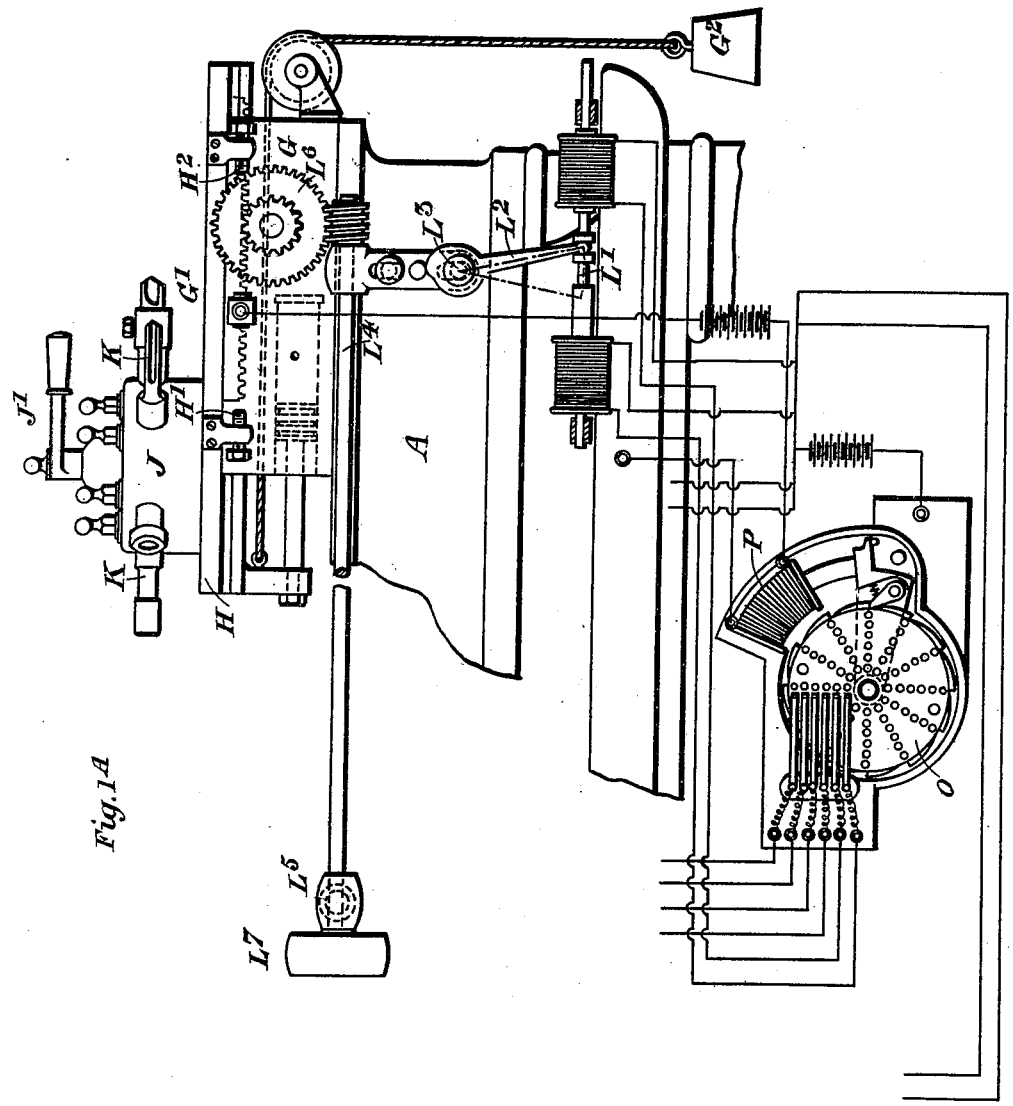

No. 627,385. Patented June 20, 1899.
J. BROCKIE.
AUTOMATIC LATHE.
(Application filed Dec. 28, 1897.)
(No Model.) 8 Sheets—Sheet 3.

No. 627,385. Patented June 20, 1899.
J. BROCKIE.
AUTOMATIC LATHE.
(Application filed Dec. 28, 1897.)
(No Model.) 8 Sheets—Sheet 4.
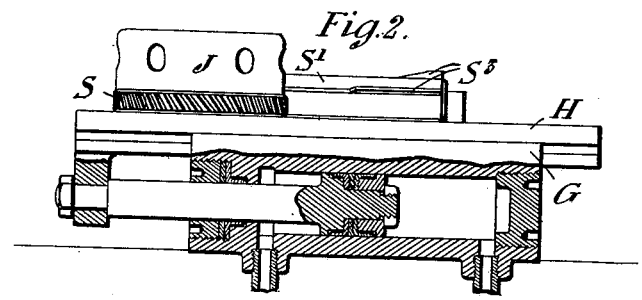
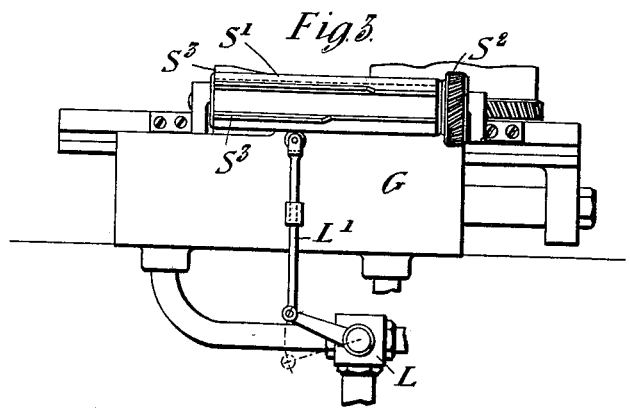
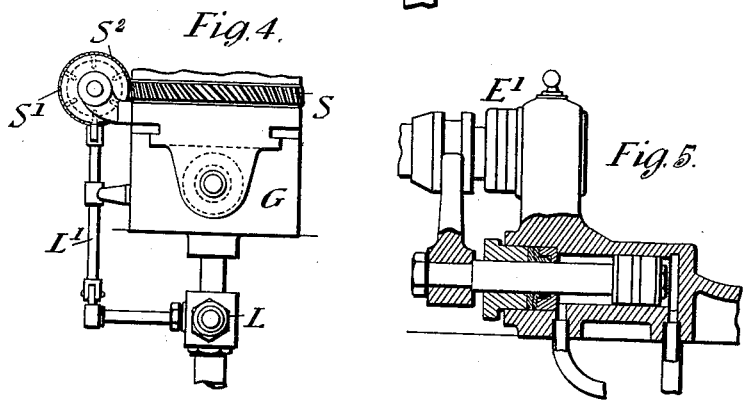
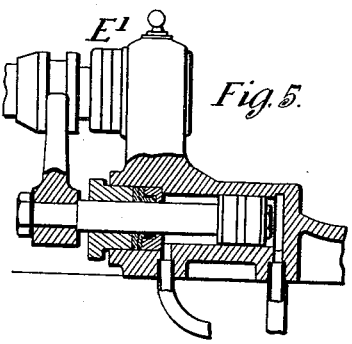
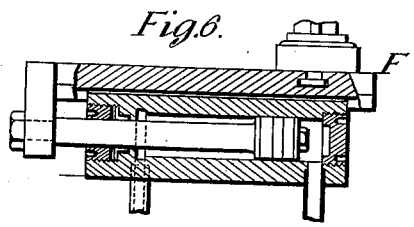

No. 627,385. Patented June 20, 1899.
J. BROCKIE.
AUTOMATIC LATHE.
(Application filed Dec. 28, 1897.)
(No Model.) 8 Sheets—Sheet 5.
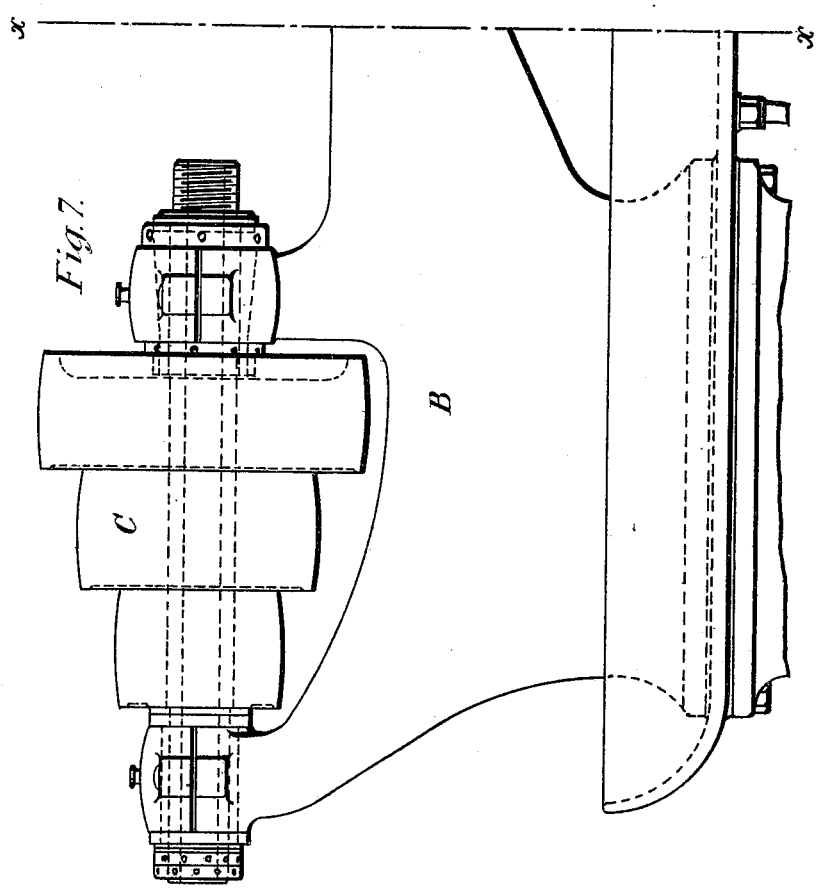

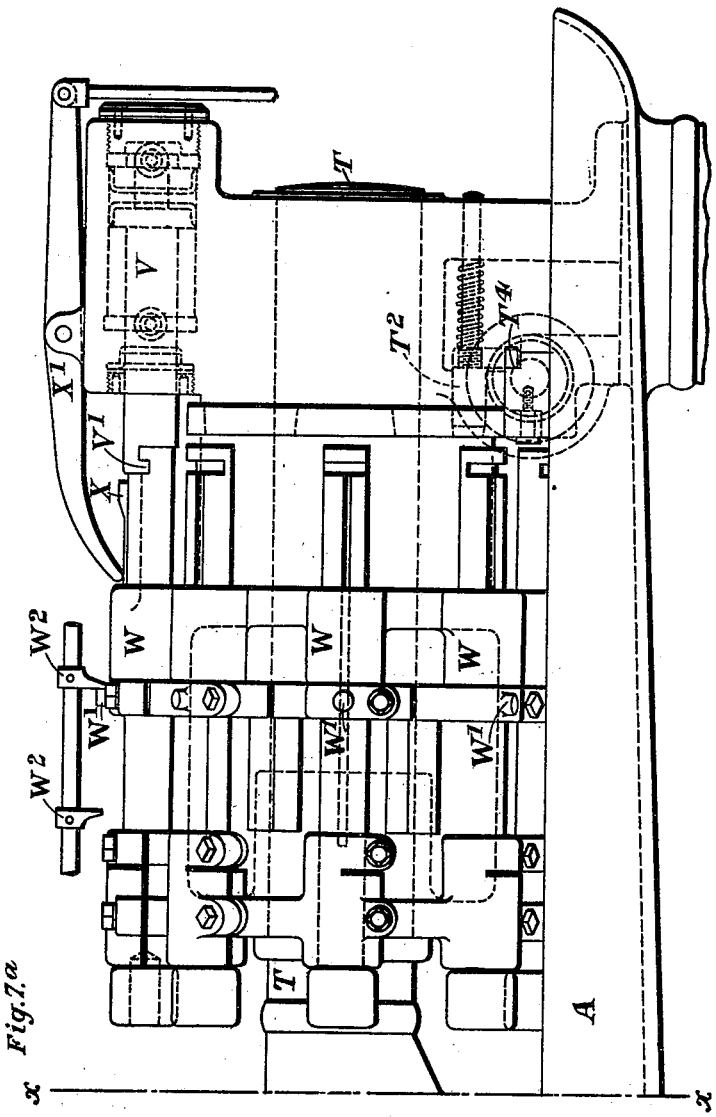

No. 627,385. Patented June 20, 1899.
J. BROCKIE.
AUTOMATIC LATHE.
(Application filed Dec. 28, 1897.)
(No Model.) 8 Sheets—Sheet 7.

No. 627,385. Patented June 20, 1899.
J. BROCKIE.
AUTOMATIC LATHE.
(Application filed Dec. 26, 1897.)
(No Model.) 8 Sheets—Sheet 8.

UNITED STATES PATENT OFFICE.

JAMES BROCKIE, OF LONDON, ENGLAND.

AUTOMATIC LATHE.

SPECIFICATION forming part of Letters Patent No. 627,385, dated June 20, 1899.

Application filed December 28, 1897. Serial No. 664,126. (No model.)

*To all whom it may concern:*

Be it known that I, JAMES BROCKIE, engineer, a citizen of England, residing at 12 Tyson road, Forest Hill, London, in the county of Kent, England, have invented certain new and useful Improvements in Automatic Lathes, of which the following is a specification.

My invention relates to lathes in which the turrets or other tool-holders are moved automatically, so as to bring successive tools into operation, each being moved through a space suited to the work to be done. Usually the turret or tool-holder when it is approaching the ends of its determined stroke acts on stops or tappets which alter the connections to the driving-gear in such a manner as to reverse the movement of the tool-holder or to turn the turret partly around, so as to bring a fresh tool into operation or to effect both of these movements. According to my invention I arrange the stops or tappets so that when they are acted on by the tool-holder they make electrical contacts, which bring into action electromagnets that effect the required change of connections for altering the tools and determining their movements. Instead of or in addition to employing stops or tappets for making these contacts a commutator may be used, this being caused to revolve by connection to the lathe-gearing and effecting successive electrical connections by which the succession and movement of the tools are determined. For each different pattern of work to be done a special commutator may be provided, having the conducting and non-conducting parts of its surface arranged to suit the movements required for the work.

In order to economize the electrical energy that would have to be employed, as above described, in moving clutches or changing gearing or performing such other mechanical work as is required for the alteration of the tools or their movements, I prefer to effect the motions of the tool-holders by hydraulic pressure, applying the electrical energy solely to move valves by which the pressure is directed the one way or the other. Thus, for instance, I attach the slide carrying the tool-holder to the piston of a hydraulic cylinder in which water or other liquid under pressure acts, so as to move the slide in the one direction or the other, according as suitable valves are acted on by electromagnets energized, as above described, when contacts are made by tappets or commutating apparatus.

I shall describe by way of example my invention as applied to an ordinary capstan turret-lathe and to a lathe having a modified form of turret, referring to the accompanying drawings.

Figure 1B:
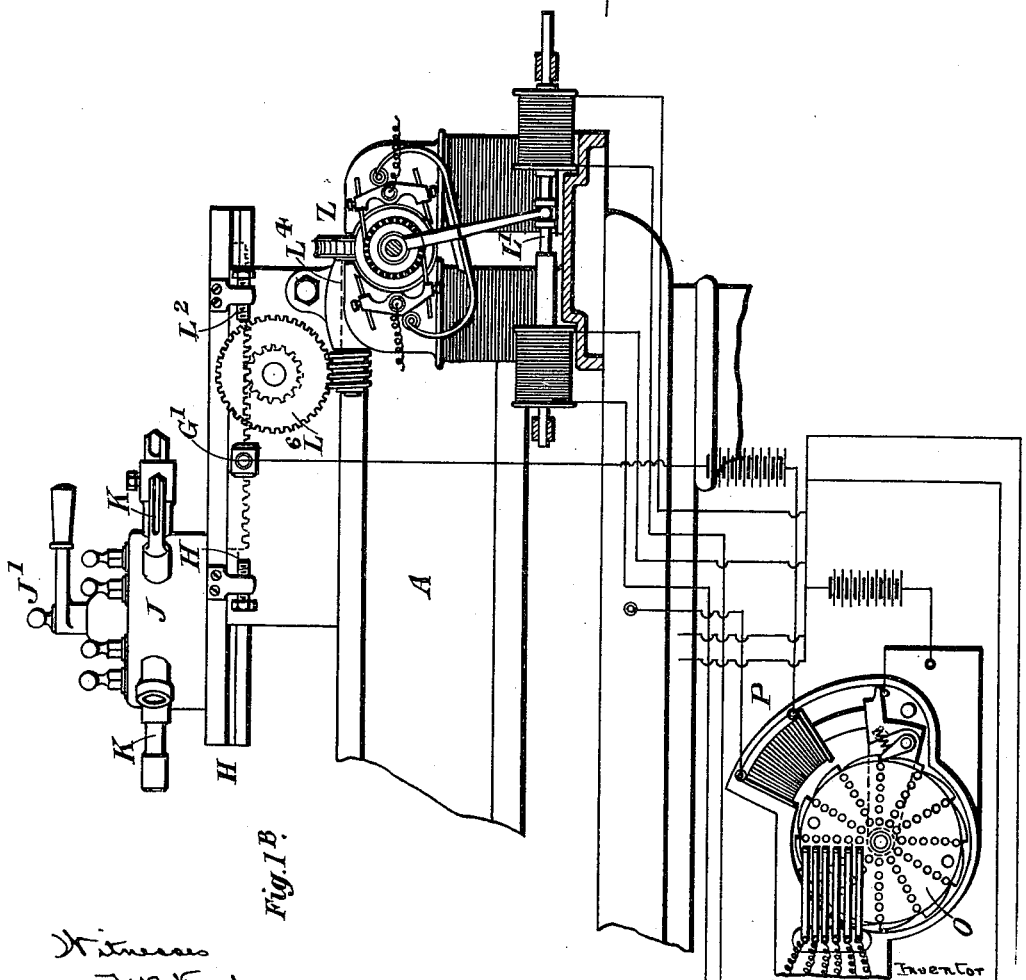
Figure 8:
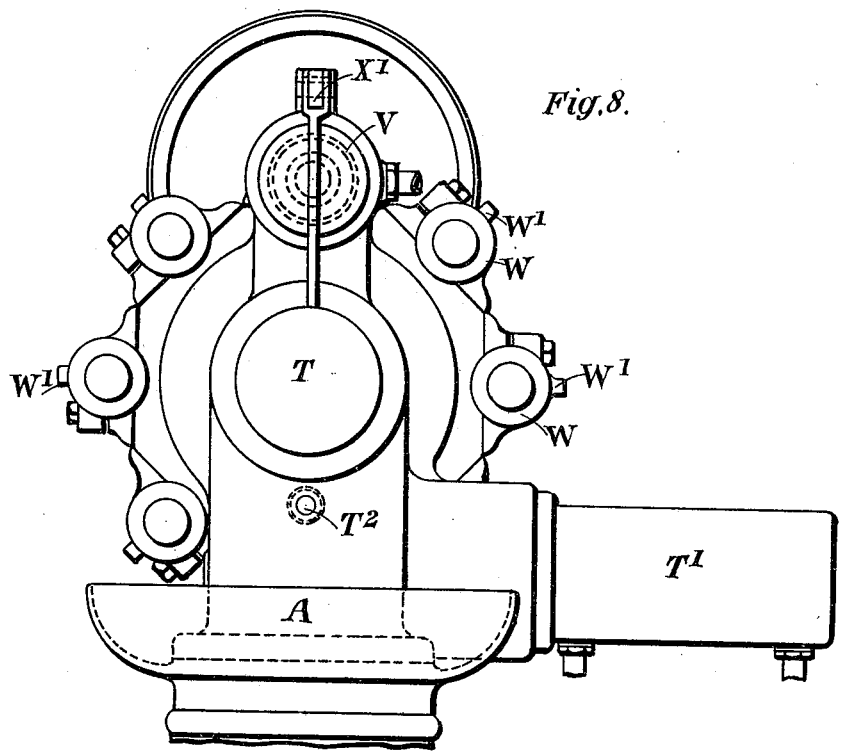
Figure 9:
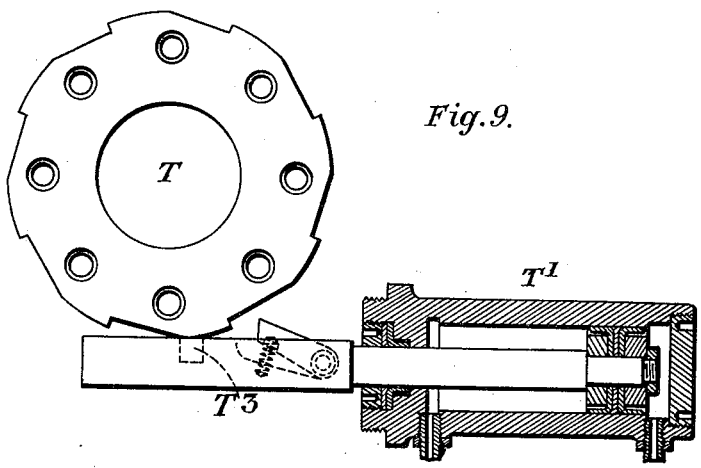

Figure 1 is a front elevation of the turret-lathe, the parts of which are moved by hydraulic pressure brought into action electrically. Fig. 1^A is a front elevation showing the turret-slide moved by electrically-controlled mechanism. Fig. 1^B is a front elevation showing the turret-slide moved by an electromotor. Fig. 1^C is a side elevation of the electromotor. Fig. 2 is a longitudinal section of the hydraulic cylinder for moving the turret-saddle. Fig. 3 is a back elevation, and Fig. 4 is an end view, of the saddle. Fig. 5 is a section partly in elevation, showing the hydraulic cylinder for operating the chuck. Fig. 6 is a longitudinal section of the hydraulic cylinder for moving the transverse or cut-off slide. Figs. 7 and 7^a together show a front elevation. Fig. 8 is an end elevation of a turret revolving on a horizontal axis, and Fig. 9 is a longitudinal section of the hydraulic cylinder and elevation of the ratchet turned by it.

Referring first to Figs. 1 to 6, inclusive, A is the lathe-bed; B, the head-stock with cone-pulley C, hollow spindle D, chuck E, and its operating mechanism E'.

F is the transverse or cut-off slide.

G is the turret block or saddle, H the turret-slide, and J the turret carrying the various tools K and provided, as usual, with tightening-screw J'.

The hydraulic cylinders (shown in section in Figs. 2, 5, and 6) for moving the turret-slide operating the chuck and moving the transverse slide, respectively, are fitted with differential pistons which are always subject to the pressure on their smaller area, and the supply of fluid under pressure to act on their larger area is governed by the valves L M N. The valve-levers are linked to the cores of double solenoids L' M' N', each consisting of an upper and a lower coil, the one when energized attracting the core upward, the other attracting the core downward. The connections of these coils to batteries or other sources of electricity are determined by a commutator, which may be in the form of a disk O, perforated with radial rows of holes, in any of which can be placed conducting-plugs which as the disk is turned step by step make contact with springs electrically connected to the several solenoid-coils. The disk O is turned step by step in the following manner: As the turret-slide H completes its stroke adjustable stops H' H² upon it act on a stationary insulated contact G', by which a curved solenoid P is alternately put in and out of circuit with a battery. The core of this solenoid has mounted on it a pawl which engages with ratchet-teeth on the disk O, so that when the solenoid P is energized its core is attracted upward, turning the disk O through one division. When one of the stops H' H² leaves G', the current is cut off from P, whereupon the core descends, so that its pawl engages with a succeeding tooth of the ratchet, which it turns another tooth when the other stop makes contact with G'. It will thus be seen that according as the contact-plugs are placed in the holes of the disk the operations of the several parts of the lathe and their order are determined. Obviously instead of a disk such as O other known forms of commutators might be employed.

In order to insure the turning of the commutator a complete division, it may have on its axis a suitable toothed wheel, acted on by a pawl such as is employed in many signaling mechanisms, or the core of the solenoid P may work an anchor on a toothed wheel, moving it partly by its upstroke and partly by its downstroke.

The turret J is turned around step by step when it makes its back stroke and locked in its successive positions by any of the known mechanism for that purpose. The speed of its working stroke can be varied as the nature of the work may require in the following manner: A skew-toothed wheel S, fixed on the turret, gearing with a skew-pinion S², turns step by step a cylinder S', having on it inclines S³ of various forms, which as the turret moves forward act on a roller on a guided rod L', linked to the lever of the valve L, so as to more or less close the valve while the turret makes its stroke.

As shown in Figs. 7ᵃ, 8, and 9, the turret is arranged to turn on a horizontal axis T, presenting tools fixed in longitudinally-sliding holders parallel to the axis. It is caused to revolve step by step by a ratchet-wheel on it acted on by a spring-pawl on the piston-rod of a hydraulic cylinder T', the valve for which is worked in the same manner as those of the cylinders already described. The turret is locked in each position by a spring-bolt T² entering a hole of the ratchet-wheel. Before the pawl in the forward stroke of the piston of T' reaches a tooth of the ratchet an incline T³ on the side of the piston-rod acts on a projection T⁴ from the bolt, withdrawing the bolt from the hole. On the piston making its return stroke the bolt is released, so that it enters the succeeding hole of the ratchet. As each tool-holder attains its uppermost position a notch V' near its rear end is engaged by a projection from the piston-rod of a hydraulic cylinder V, which in making its stroke pushes the tool-holder forward and then draws it back. On each tool-holder is adjustably fixed a collar W, carrying a tappet W', which meets contacts W² at each end of its stroke, and thereby brings into action each of the two solenoid-coils, which, as previously described, operate the valve for the cylinder V. The tool-holders have fixed on them suitable inclines X, which act on a lever X', linked to the rod of the valve for the cylinder V, closing it more or less, and thus determining the speed of the tool in its working stroke.

Referring to Fig. 1ᴬ, the core of the double solenoid L' when the one coil or the other is excited moves a lever L², having on its axis a cam L³, acting on a slide which has one bearing for a worm-shaft L⁴, the other bearing L⁵ being swiveled, allowing the shaft L⁴ to be raised or lowered, according as the lever L³ is moved to the one hand or the other. When the shaft L⁴, which carries a pulley L⁷, driven by a belt, is raised into gear with the worm-wheel L⁶, the turret-slide H is advanced. When the shaft L⁴ is lowered, the worm is disengaged from the worm-wheel and the turret-slide is retracted by a weight G². The one or the other of the two solenoid-coils at L' is excited according as the one or the other of the stops H' H² makes contact with G', as explained in reference to Fig. 1.

As shown in Figs. 1ᴮ and 1ᶜ, the core of the double solenoid L' moves the commutator-brushes of an electromotor Z, causing it to revolve in the one direction or the other, driving the worm-shaft L⁴, so as to advance and retract the turret-slide G.

Although in Figs. 1ᴬ, 1ᴮ, and 1ᶜ I have shown arrangements for moving only the turret-slide, obviously similar mechanism similarly controlled by electricity can be applied to effect the movements of the mandrel or chuck and of the transverse slide.

Although separate batteries are shown for operating the several solenoids, this being done in order that the connections may the more readily be traced, obviously a single battery or other source of electricity may be employed.

Having thus described the nature of this invention and the best means I know of carrying the same into practical effect, I claim—

1. In a turret or automatic lathe, the combination of sliding parts, motors for actuating said parts, solenoids for throwing said motors into and out of operation, and an electrically-operated commutator for connecting the coils of said solenoids with and disconnecting them from a source of electricity, substantially as described.

2. In a turret or automatic lathe, the combination with sliding parts, of valved hydraulic cylinders for actuating said parts, solenoids operating the valves of said cylinders, and an electrically-operated commutator for connecting the coils of said solenoids with and disconnecting them from a source of electricity, substantially as described.

3. In a turret or automatic lathe, the combination with a tool-holder mounted on a horizontal axis, of a valved hydraulic cylinder having a piston-rod and pawl to turn the toolholder step by step, a solenoid operating the valve of said cylinder, and an electrical commutator for connecting the coil of said solenoid with and disconnecting it from a source of electricity, substantially as described.

In testimony whereof I have signed my name to this specification, in the presence of two subscribing witnesses, this 24th day of November, A. D. 1897.

JAMES BROCKIE.

Witnesses:
  OLIVER IMRAY,
  GERALD L. SMITH.